United States Patent
Greene

(10) Patent No.: US 6,719,637 B1
(45) Date of Patent: Apr. 13, 2004

(54) SHAFT EXTENSION BEARING SUPPORT FOR DRIVE MECHANISM

(75) Inventor: Aaron Greene, Reno, NV (US)

(73) Assignee: Paramount Custom Cycles, Reno, NV (US)

(*) Notice: Subject to any disclaimer, the term of this patent is extended or adjusted under 35 U.S.C. 154(b) by 0 days.

(21) Appl. No.: 10/041,876

(22) Filed: Jan. 7, 2002

(51) Int. Cl.[7] .................................................. F16C 3/02
(52) U.S. Cl. ........................................ 464/182; 74/15.6
(58) Field of Search ................................ 464/177, 178, 464/182, 184; 474/903; 180/346; 384/904; 74/15.6–15.69

(56) References Cited

U.S. PATENT DOCUMENTS

| | | | |
|---|---|---|---|
| 1,218,686 A | | 3/1917 | Morse et al. |
| 1,609,288 A | * | 12/1926 | Bloss .......................... 464/184 |
| 2,521,729 A | * | 9/1950 | Keese ..................... 74/15.63 X |
| 2,878,681 A | * | 3/1959 | Howlett ....................... 74/15.66 |
| 3,279,835 A | | 10/1966 | Krohm |
| 3,588,154 A | | 6/1971 | Voight |
| 3,990,550 A | | 11/1976 | Recker |
| 4,121,532 A | | 10/1978 | Coryell, III |
| 4,536,038 A | * | 8/1985 | Krude ...................... 464/178 X |
| 4,616,729 A | | 10/1986 | Kasai |
| 4,794,998 A | | 1/1989 | Iwai et al. |
| 5,006,007 A | | 4/1991 | Fischer et al. |
| 5,339,703 A | * | 8/1994 | Tanaka ................... 74/15.66 X |
| 5,688,067 A | | 11/1997 | Straub |
| 5,967,751 A | * | 10/1999 | Chen ....................... 464/182 X |
| 6,241,616 B1 | | 6/2001 | Lightcap |
| 6,267,528 B1 | | 7/2001 | Higashino |

* cited by examiner

*Primary Examiner*—Greg Binda
(74) *Attorney, Agent, or Firm*—Townsend and Townsend and Crew LLP

(57) ABSTRACT

Embodiments of the invention provide a bearing support for the primary drive shaft extension of a motorcycle or the like so that the main bearing support is as close to the drive mechanism as possible. In one embodiment, the shaft extension device comprises a shaft extension member configured to be attached to the shaft to rotate with the shaft. The shaft extension member includes a bearing surface disposed at a distance axially spaced from the shaft. A primary spacer is configured to be connected to the motor casing. A bearing is supported by the primary spacer to be axially spaced from the shaft and to contact the bearing surface of the shaft extension member to provide bearing support for the shaft extension member.

20 Claims, 6 Drawing Sheets

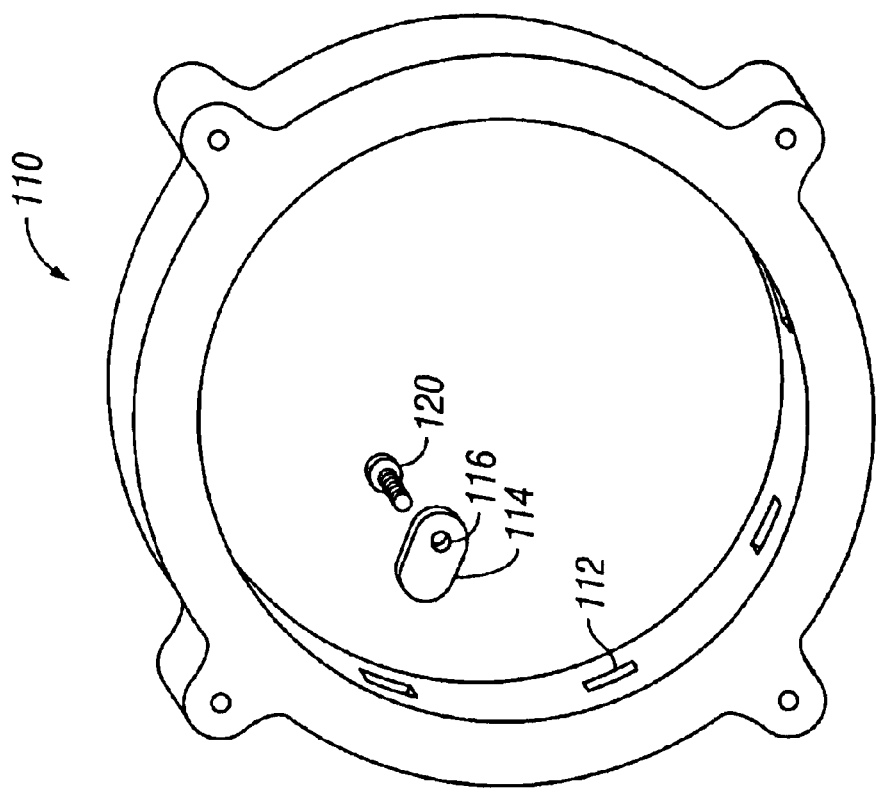
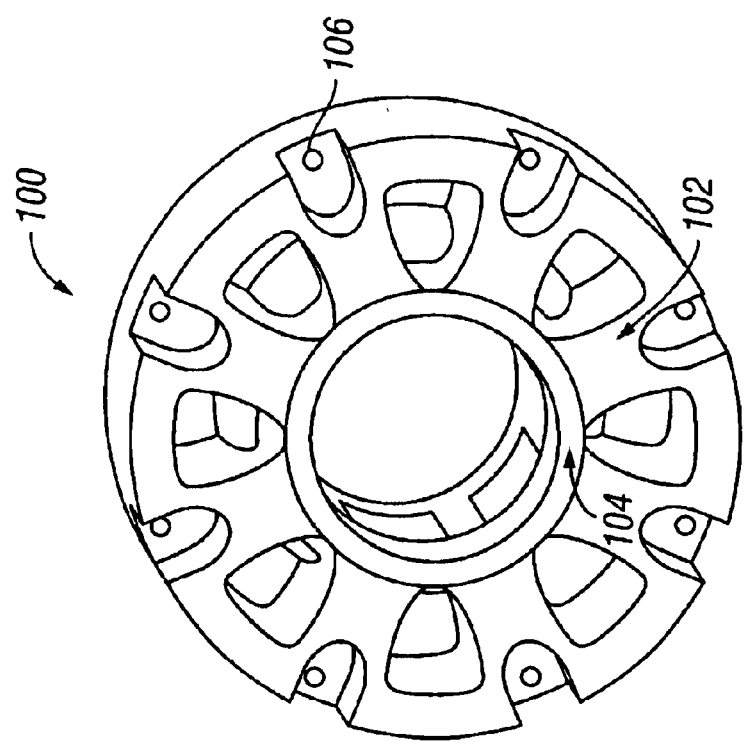
FIG. 7

SHAFT EXTENSION BEARING SUPPORT FOR DRIVE MECHANISM

BACKGROUND OF THE INVENTION

The present invention relates generally to shaft extension apparatus and, more particularly, to a shaft extension device for a drive mechanism of a motorcycle or the like.

In the design of vehicles, machines, and the like, it may be necessary or desirable to change the location of the driven component (e.g., a driven sprocket and shaft) with respect to the location of the driving component (e.g., a motor and drive mechanism). For instance, when normal tires are replaced by oversized tires on motorcycles having widths of 250 mm, 300 mm, or larger, it is necessary to make room for the oversized tires. The motor will often need to be moved away from the central plane of the motorcycle on which the drive mechanism lies. The larger the tires, the greater the offset is between the motor and the central plane. This requires shaft extensions for the motor comparable to the amount of the offset. Conventional ways of extending the shaft tend to be cumbersome, and can result in a substantial bending load on the extended shaft.

BRIEF SUMMARY OF THE INVENTION

The present invention is directed to an apparatus and a method of providing shaft extension for a drive mechanism. Embodiments of the invention provide a bearing support for the primary drive shaft extension of a motorcycle or the like so that the main bearing support is as close to the drive mechanism as possible. The motor is coupled to a motor shaft having a given length. To extend the shaft length, a splined spacer is attached to the motor shaft. A shaft extension member having a bearing surface and a shaft extension is connected to the splined spacer. A bearing is positioned over the bearing surface of the shaft extension member. A bearing support member connects the bearing to a primary spacer. The bearing support member is attached to the front portion of the primary spacer. The rear portion of the primary spacer extends rearward to connect to the motor casing. The shaft extension apparatus can be designed for different shaft extension sizes, and can be offered as a kit to extend the shaft to a desired length for offsetting the motor to accommodate particular tire sizes. There is no need to design different jigs for different shaft extensions.

An aspect of the present invention is directed to a shaft extension device for a drive mechanism having a shaft and a motor casing. The shaft extension device comprises a shaft extension member configured to be attached to the shaft to rotate with the shaft. The shaft extension member includes a bearing surface disposed at a distance axially spaced from the shaft. A primary spacer is configured to be connected to the motor casing. A bearing is supported by the primary spacer to be axially spaced from the shaft and to contact the bearing surface of the shaft extension member to provide bearing support for the shaft extension member.

In some embodiments, a splined spacer is connected to the shaft extension member to axially space the shaft extension member from the shaft. The splined spacer has an inner splined surface configured to contact an outer splined surface of the shaft. A nut is configured to be threadingly coupled to a threaded portion of the shaft distal of the outer splined surface of the shaft. The splined spacer is detachably connected to the shaft extension member by a plurality of fasteners. The shaft extension member comprises an outer splined surface disposed distal of the bearing surface and a threaded portion disposed distal of the outer splined surface.

In specific embodiments, a bearing support member is connected to the primary spacer, and includes an inner bearing support surface configured to support the bearing. The bearing support member is detachably connected to the primary spacer by a plurality of fasteners. The primary spacer includes a plurality of inner slots. A plurality of tabs are partially received into the plurality of inner slots, and each include an aperture. The plurality of fasteners each extend through an aperture of one of the plurality of tabs to fasten the primary spacer via the plurality of tabs to the bearing support member.

In accordance with another aspect of the invention, a shaft extension device for a drive mechanism having a shaft and a motor casing comprises a shaft extension member configured to be attached to the shaft to rotate with the shaft. The shaft extension member includes a bearing surface disposed at a distance axially spaced from the shaft. A bearing support member has a bearing support surface axially spaced from the shaft. A bearing is supported by the bearing support surface of the bearing support member to be axially spaced from the shaft and to contact the bearing surface of the shaft extension member to provide bearing support for the shaft extension member.

In some embodiments, a primary spacer is configured to be attached to the motor casing, and the primary spacer is connected to the bearing support member to axially space the bearing support surface of the bearing support member from the shaft. A fastening member is configured to fasten the splined spacer to the shaft.

Another aspect of the present invention is directed to a method of providing a shaft extension for a drive mechanism having a shaft and a motor casing. The method comprises attaching a shaft extension member to the shaft for rotation with the shaft. The shaft extension member includes a bearing surface disposed at a distance axially spaced from the shaft. The method further comprises placing a bearing over the bearing surface of the shaft extension member at the distance axially spaced from the shaft, and supporting the bearing at the distance axially spaced from the shaft to generally maintain alignment of the shaft extension member with the shaft.

In some embodiments, the shaft extension member is attached to a shaft extension spacer which is connected to the shaft and axially spaces the shaft extension member from the shaft. The shaft extension spacer has an inner splined surface configured to contact an outer splined surface of the shaft, and a nut is threadingly coupled to a threaded portion of the shaft distal of the outer splined surface of the shaft to secure the shaft extension spacer to the shaft. The shaft extension member is detachably connected to the shaft extension spacer by a plurality of fasteners. The bearing is supported by a bearing support member which is connected to a primary spacer attached to the motor casing. The bearing support member is detachably connected to the primary spacer by a plurality of fasteners.

BRIEF DESCRIPTION OF THE DRAWINGS

FIG. 6 is a cross-sectional view of the assembled shaft extension apparatus 10 of FIG. 1;

FIG. 7 is an exploded perspective view of a bearing support member 100 and a primary spacer 110 according to another embodiment of the present invention;

DETAILED DESCRIPTION OF THE INVENTION

Embodiments of the invention provide a bearing support for the primary drive shaft extension for a motorcycle or the like so that the main bearing support is as close to the drive mechanism as possible.

Figure 1:
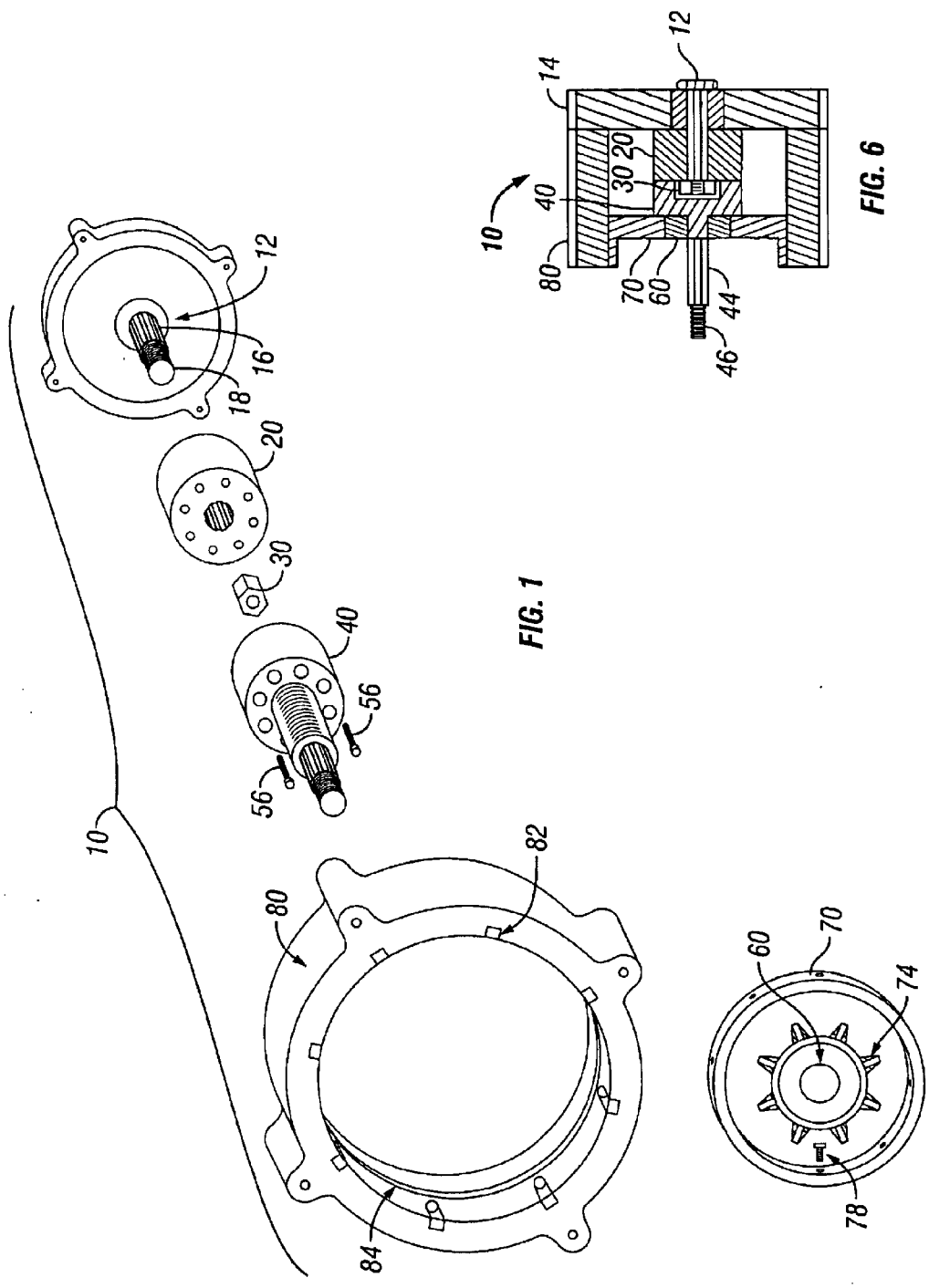
FIG. 1 is an exploded perspective view of a shaft extension apparatus 10 for a motor shaft 12 and a motor casing 14 according to an embodiment of the present invention.
Figure 2:
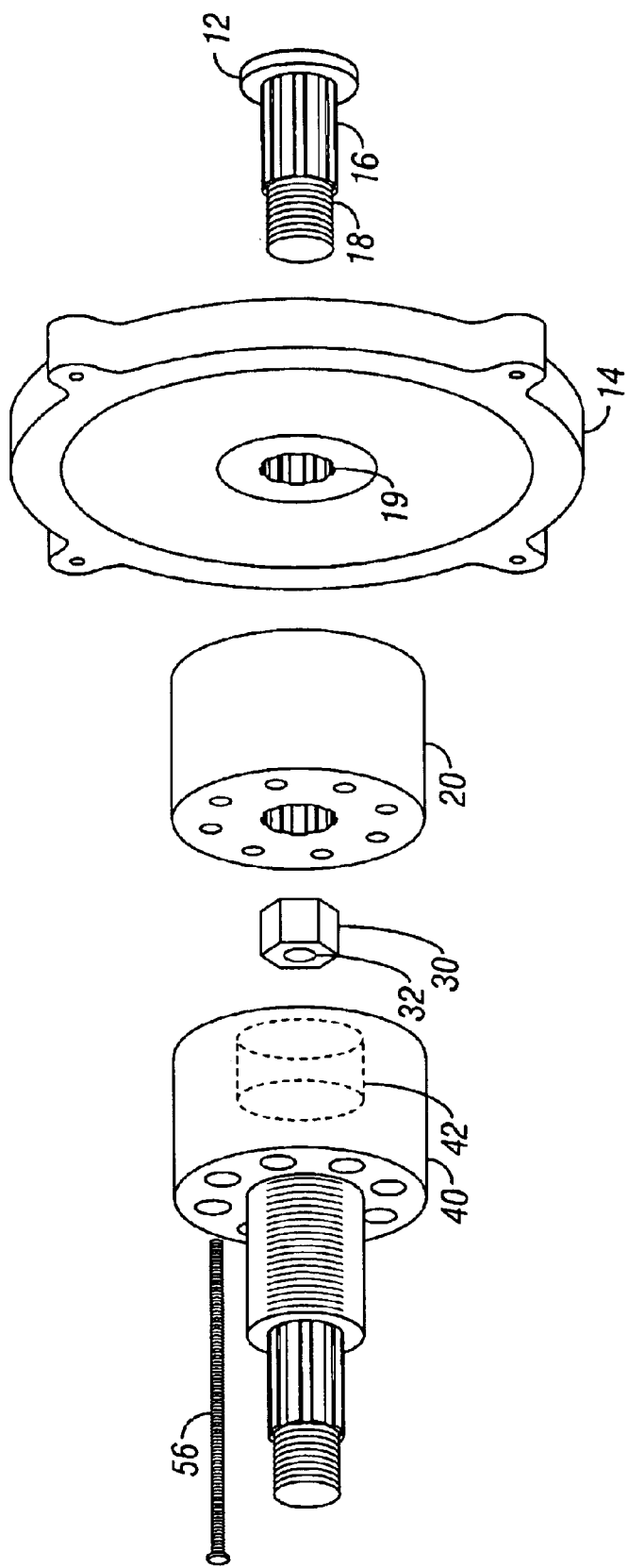
FIG. 2 is an exploded perspective view of a portion of the shaft extension apparatus 10 of FIG. 1.

FIG. 1 shows a shaft extension apparatus 10 for a drive mechanism having a motor shaft 12 and a motor casing 14. The motor shaft 12 includes an outer splined surface 16 and a threaded portion 18 distal of the outer splined surface 16. As seen in FIG. 2, the motor casing 14 typically has an aperture with a splined surface 19 to mate with the outer splined surface 16 of the motor shaft 12. The shaft extension apparatus 10 includes a shaft extension spacer 20, a retaining or securing member 30, a shaft extension member 40, a bearing 60, a bearing support member 70, and a primary spacer or primary spacer 80, as illustrated in FIGS. 1–5. FIG. 6 is a cross-sectional view of an assembled shaft extension apparatus 10 coupled to the motor shaft 12 and motor casing 14.

Figure 3:
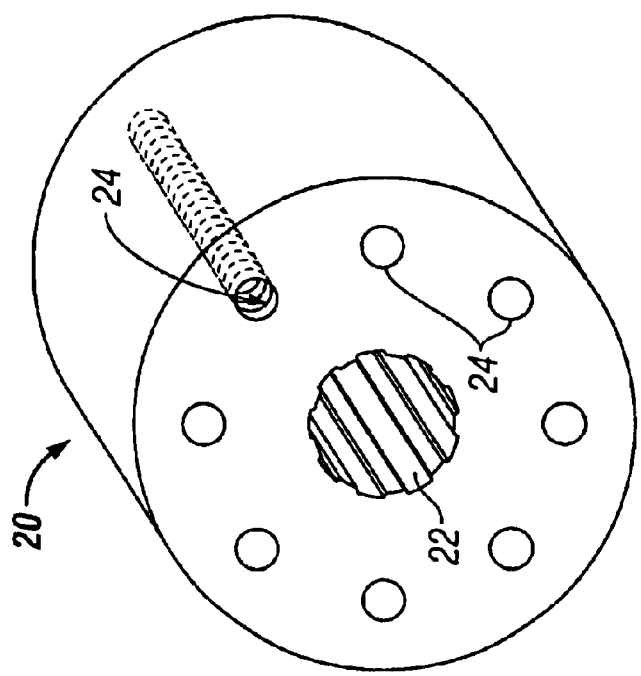
FIG. 3 is a perspective view of the shaft extension spacer 20 in the shaft extension apparatus 10 of FIG. 1.

As more clearly seen in FIGS. 2 and 3, the shaft extension spacer 20 includes a splined hole 22 which is configured to cooperate or mate with the outer splined surface 16 of the motor shaft 12 to rotate with the motor shaft 12. The length of the splined shaft extension spacer 20 may be selected to provide the desired shaft extension. The shaft extension spacer 20 includes a plurality of apertures 24 which typically extend partly through the length of the spacer 20. The apertures 24 are distributed around the splined hole 22. In the embodiment shown, the apertures 24 are threaded for receiving threaded fasteners. To secure the splined spacer 20 to the motor shaft 12, a nut 30 or similar retaining member is used. The nut 30 includes a threaded aperture 32, as shown in FIG. 2, which is threadingly connected to the threaded portion 18 of the motor shaft 12 to secure the splined spacer 20 to the motor shaft 12. The shaft extension member 40 desirably includes a cavity 42 to accommodate the securing nut 30, as seen in FIG. 2.

Figure 4:
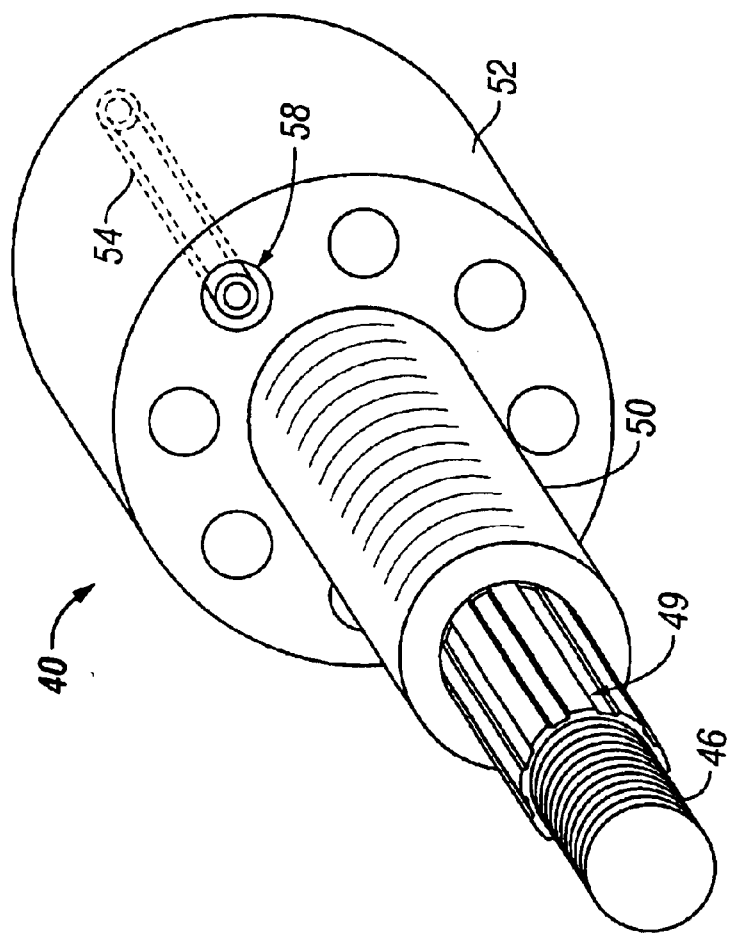
FIG. 4 is a perspective view of the shaft extension member 40 in the shaft extension apparatus 10 of FIG. 1.

As shown in FIG. 4, the shaft extension member 40 includes an outer splined surface 44 and a threaded portion 46 distal of the outer splined surface 44, similar to those of the motor shaft 12. The outer splined surface 44 and threaded portion 46 are disposed distal of a bearing surface 50 which is configured to contact the bearing 60. The bearing surface 50 is disposed distal of an extension body 52 of the shaft extension member 40. The length of the extension body 52 may be selected to provide the desired shaft extension. A plurality of apertures 54 extend longitudinally through the extension body 52, and are distributed around the extension body 52 to correspond to the apertures 24 of the shaft extension spacer 20. The apertures 54 in the embodiment shown are threaded for receiving threaded fasteners such as bolts 56, as shown in FIGS. 1 and 2. The apertures 54 desirably include countersinks or slots 58 for receiving the heads of the bolts 56 to reduce or eliminate the protrusion of the heads of the bolts 58 from the extension body 52.

Figure 5:
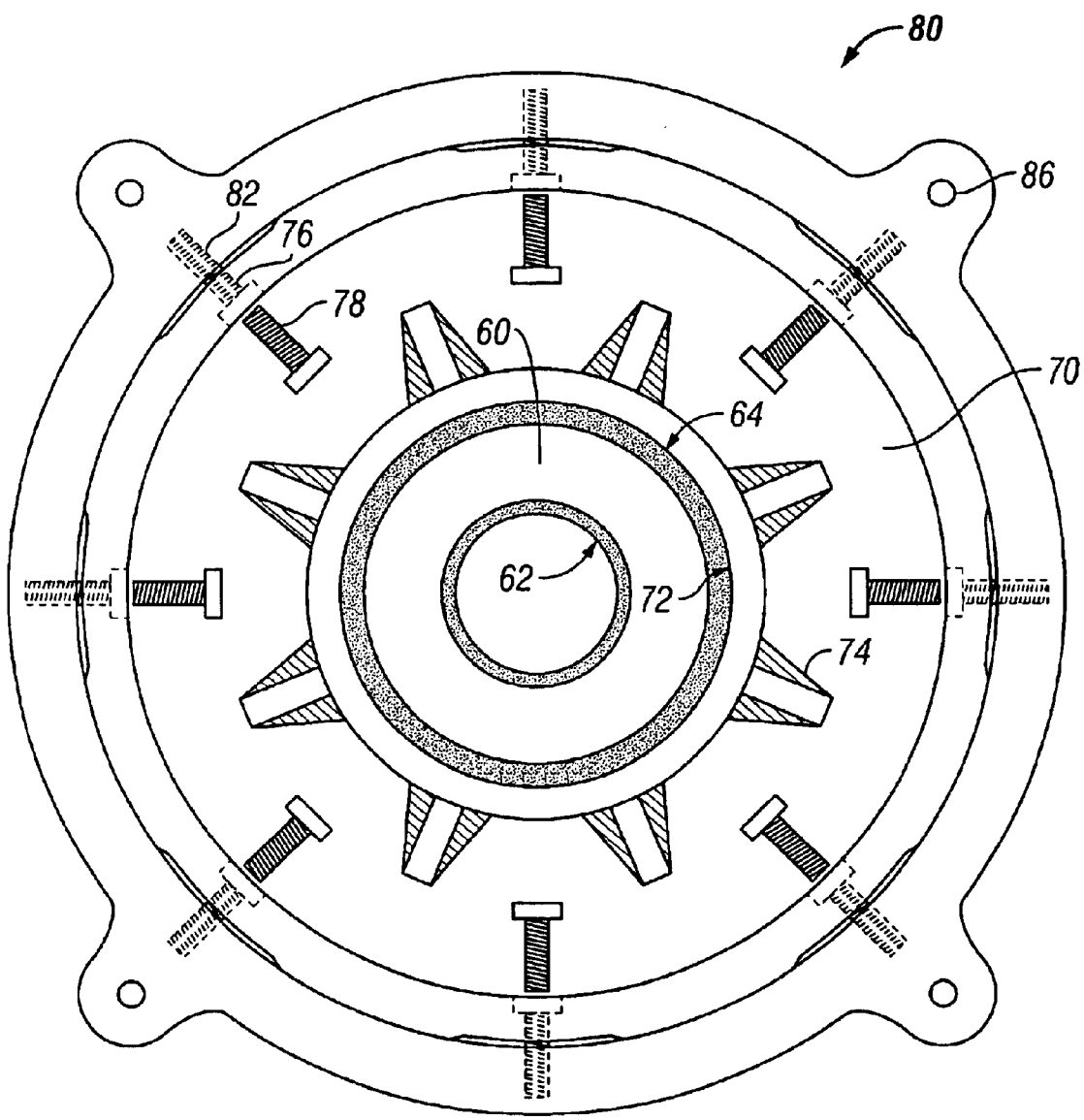
FIG. 5 is a front elevational view of the bearing 60, bearing support member 70, and primary spacer 80 of the shaft extension apparatus 10 of FIG. 1 as assembled.

FIG. 5 shows the bearing 60, the bearing support member 70, and the primary spacer 80 assembled together. The bearing 60 includes an inner bearing surface 62 for contacting the bearing surface 50 of the shaft extension member 40. The outer bearing surface 64 of the bearing 60 is supported by the bearing support surface 72 of the bearing support member 70. The bearing support member 70 may be a plate or a shell-like structure. In some embodiments, the bearing support member 70 may include support gussets 74 distributed around the bearing support surface 72 for the bearing 60. The bearing support plate 70 includes a plurality of radial apertures 76 distributed around the periphery. A plurality of fasteners such as screws 78 extend through the radial apertures 76 and threadingly engage the threaded slots 82 of the primary spacer 80 to fasten the bearing support plate 70 to the front portion of the primary spacer 80. As seen in FIG. 1, the primary spacer 80 may include a ledge or a snap ring groove 84 to indicate the location of the bearing support plate 70. A plurality of longitudinal primary spacer apertures 86 are provided for receiving fasteners for attaching the primary spacer 80 to the motor casing 14.

FIG. 6 shows the assembled shaft extension apparatus 10 coupled to the motor shaft 12 and motor casing 14. The primary spacer 80 extends rearward to connect with the motor casing 14 using fasteners or the like extending longitudinally through the primary spacer apertures 86, and spaces the bearing support for the shaft extension member 40 from the motor casing 14. The bearing 60 allows relative rotation of the shaft extension member 40 with respect to the bearing support member 70 and the primary spacer 80.

Figure 9:
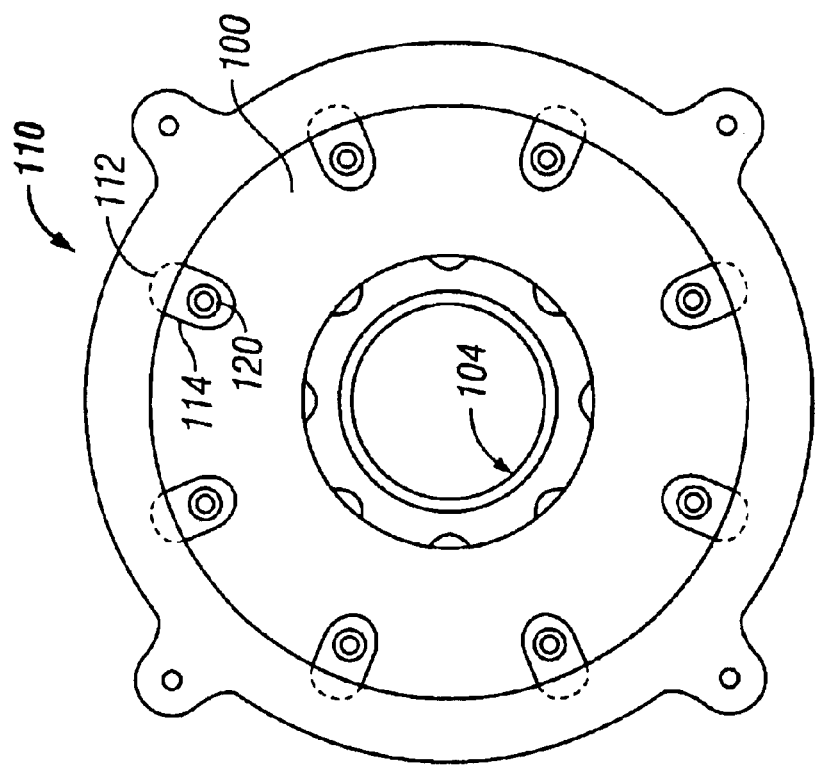
FIG. 9 is a rear elevational view of the assembled bearing support member 100 and primary spacer 110 of FIG. 7.
Figure 8:
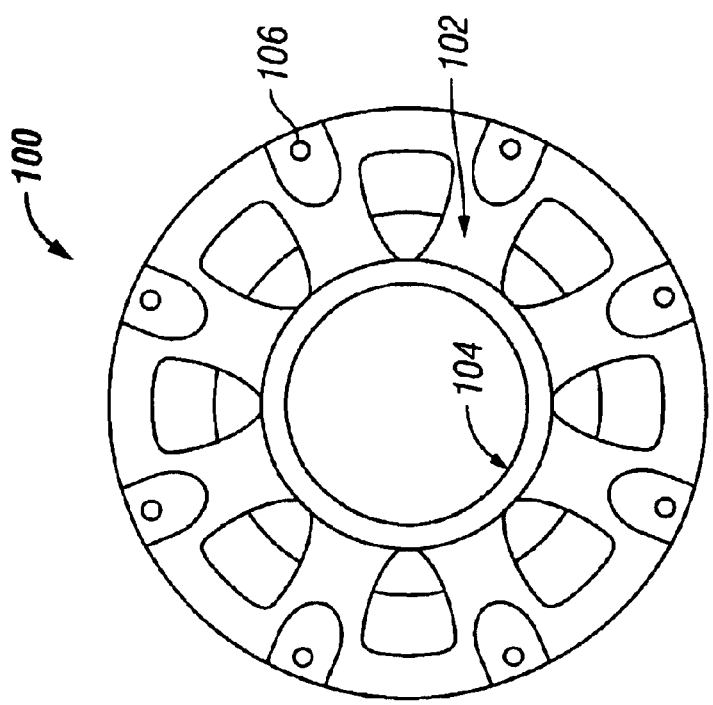
FIG. 8 is a front elevational view of the bearing support member 100 of FIG. 7.

FIG. 7 shows another set of bearing support member 100 and primary spacer 110 according to another embodiment of the invention. The bearing support member 100 includes a front protruded portion 102 to provide the bearing support surface 104. As shown in FIGS. 7 and 8, the bearing support member 100 includes a plurality of longitudinal apertures 106 distributed around its periphery for receiving fasteners. The longitudinal apertures 106 are typically threaded. The primary spacer 110 includes a plurality of radial slots 112 distributed around the inner surface for partially receiving a plurality of tabs 114. Each tab 114 includes an aperture 116, which may be countersunk, for receiving a fastener such as a screw 120. The screw 120 extends through the aperture 116 of the tab 114, and is threadingly coupled to the corresponding threaded longitudinal aperture 106 of the bearing support member 100 to attach the primary spacer 110 to the bearing support member 100, as best seen in FIG. 9.

It is to be understood that the above description is intended to be illustrative and not restrictive. Many embodiments will be apparent to those of skill in the art upon reviewing the above description. By way of example, the present invention may be used to provide shaft extension in other vehicles and machines. The various components may have different shapes and sizes from those illustrated in the drawings. The scope of the invention should, therefore, be determined not with reference to the above description, but instead should be determined with reference to the appended claims along with their full scope of equivalents.

What is claimed is:

1. A shaft extension device for a drive mechanism having a shaft and a casing having an outer shape and an arrangement of outer apertures, the shaft extension device comprising:

a shaft extension member configured to be attached to the shaft to rotate with the shaft, the shaft extension member including a bearing surface disposed at a distance axially spaced from the shaft;

a primary spacer configured to be connected to the casing, and to have identical outer shape and arrangement of outer apertures as the casing; and a bearing supported by the primary spacer to be axially spaced from the shaft and to contact the bearing surface of the shaft extension member to provide bearing support for the shaft extension member.

2. The shaft extension device of claim 1 further comprising a splined spacer connected to the shaft extension member to axially space the shaft extension member from the shaft, the splined spacer having an inner splined surface configured to contact an outer splined surface of the shaft.

3. The shaft extension device of claim 2 further comprising a nut configured to be threadingly coupled to a threaded portion of the shaft distal of the outer splined surface of the shaft.

4. The shaft extension device of claim 2 wherein the splined spacer is detachably connected to the shaft extension member by a plurality of fasteners.

5. The shaft extension device of claim 1 wherein the shaft extension member comprises an outer splined surface disposed distal of the bearing surface and a threaded portion disposed distal of the outer splined surface.

6. The shaft extension device of claim 5 wherein the outer splined surface and the threaded portion of the shaft extension member are substantially identical to, and oriented in the same direction as, an outer splined surface and a threaded portion of the shaft.

7. The shaft extension device of claim 6 wherein the shaft extension member is generally aligned axially with the shaft.

8. The shaft extension device of claim 1 further comprising a bearing support member connected to the primary spacer, the bearing support member include an inner bearing support surface configured to support the bearing.

9. The shaft extension device of claim 8 wherein the bearing support member is detachably connected to the primary spacer by a plurality of fasteners.

10. The shaft extension device of claim 9 wherein the primary spacer includes a plurality of inner slots, further comprising a plurality of tabs partially received into the plurality of inner slots, the plurality of tabs each including an aperture, wherein the plurality of fasteners each extend through an aperture of one of the plurality of tabs to fasten the primary spacer via the plurality of tabs to the bearing support member.

11. The shaft extension device of claim 1 wherein the shaft extension member comprises an outer surface disposed distal of the bearing surface which is substantially identical to an outer surface of the shaft.

12. A shaft extension device for a drive mechanism having a shaft and a casing, the shaft extension device comprising:

a shaft extension member configured to be attached to the shaft to rotate with the shaft, the shaft extension member including a bearing surface disposed at a distance axially spaced from the shaft;

a bearing support member having a bearing support surface axially spaced from the shaft; and a bearing supported by the bearing support surface of the bearing support member to be axially spaced from the shaft and to contact the bearing surface of the shaft extension member to provide bearing support for the shaft extension member;

wherein the shaft extension member comprises an outer surface pattern disposed distal of the bearing surface which is configured to be substantially identical to an outer surface pattern of the shaft.

13. The shaft extension device of claim 12 further comprising a primary spacer configured to be attached to the casing, the primary spacer being connected to the bearing support member to axially space the bearing support surface of the bearing support member from the shaft.

14. The shaft extension device of claim 9 further comprising a splined spacer connected to the shaft extension member to axially space the shaft extension member from the shaft, the splined spacer having an inner splined surface configured to contact an outer splined surface of the shaft.

15. The shaft extension device of claim 14 further comprising a fastening member configured to fasten the splined spacer to the shaft.

16. The shaft extension device of claim 12 wherein the shaft extension member comprises an outer splined surface disposed distal of the bearing surface and a threaded portion disposed distal of the outer splined surface, and wherein the outer splined surface and the threaded portion of the shaft extension member are substantially identical to, and oriented in the same direction as, an outer splined surface and a threaded portion of the shaft.

17. The shaft extension device of claim 12 further comprising a primary spacer configured to be connected to the casing, the primary spacer and the casing having identical outer shape and arrangement of outer apertures.

18. A shaft extension device for a drive mechanism having a shaft and a casing, the shaft extension device comprising:

a shaft extension member configured to be attached to the shaft to rotate with the shaft, the shaft extension member including a bearing surface disposed at a distance axially spaced from the shaft;

a primary spacer configured to be connected to the casing; and a bearing supported by the primary spacer to be axially spaced from the shaft and to contact the bearing surface of the shaft extension member to provide bearing support for the shaft extension member;

wherein the shaft extension member comprises an outer surface pattern disposed distal of the bearing surface which is configured to be substantially identical to an outer surface pattern of the shaft.

19. The shaft extension device of claim 18 wherein the shaft extension member comprises an outer splined surface disposed distal of the bearing surface, and wherein the outer splined surface of the shaft extension member is substantially identical to an outer splined surface of the shaft.

20. The shaft extension device of claim 19 wherein the shaft extension member comprises a threaded portion disposed distal of the outer splined surface, and wherein the outer splined surface and the threaded portion of the shaft extension member are substantially identical to, and oriented in the same direction as, the outer splined surface and a threaded portion of the shaft.

\* \* \* \* \*